United States Patent
Cho et al.

(10) Patent No.: US 7,316,858 B2
(45) Date of Patent: Jan. 8, 2008

(54) FUEL CELL SYSTEM

(75) Inventors: Tae-Hee Cho, Gyeongsangnam-Do (KR); Myung-Seok Park, Gyeongsangnam-Do (KR); Hong Choi, Gyeongsangnam-Do (KR); Kyu-Jung Kim, Seongnam (KR); Myeong-Ho Lee, Busan (KR); Cheol-Hwan Kim, Gyeongsangnam-Do (KR); Yong-Jun Hwang, Gyeongsangnam-Do (KR); Seung-Tae Ko, Daegu (KR); Seong-Geun Heo, Busan (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 10/483,384

(22) PCT Filed: Dec. 12, 2003

(86) PCT No.: PCT/KR03/02732

§ 371 (c)(1),
(2), (4) Date: Jan. 12, 2004

(87) PCT Pub. No.: WO2005/057710

PCT Pub. Date: Jun. 23, 2005

(65) Prior Publication Data
US 2005/0142418 A1    Jun. 30, 2005

(51) Int. Cl.
*H01M 8/04* (2006.01)
*H01M 8/06* (2006.01)
*H01M 8/10* (2006.01)

(52) U.S. Cl. .......................... 429/38; 429/19; 429/32

(58) Field of Classification Search .................. 429/12, 429/19, 32, 38
See application file for complete search history.

(56) References Cited

U.S. PATENT DOCUMENTS

2003/0003336 A1*    1/2003    Colbow et al. ................ 429/24

OTHER PUBLICATIONS

Russian Office Action received on Mar. 13, 2007 (Full Russian text and full English translation).

* cited by examiner

*Primary Examiner*—Gregg Cantelmo
(74) *Attorney, Agent, or Firm*—KED & Associates, LLP

(57) ABSTRACT

A fuel cell system is provided which produces improved reaction speed and performance. The fuel cell system includes a fuel cell stack including an anode, a cathode, and an electrolyte membrane disposed therebetween. A fuel tank supplies hydrogen-based fuel to the anode of the fuel cell stack, and an oxidant supplying unit adds ozone to oxygen-including air supplies it to the cathode of the fuel cell stack. The ozone supplied to the cathode of the fuel cell stack accelerates a reaction speed in the fuel cell stack, thereby producing a relatively high current density and improving fuel cell performance.

11 Claims, 3 Drawing Sheets

FUEL CELL SYSTEM

TECHNICAL FIELD

The present invention relates to a fuel cell system, and more particularly, to a fuel cell system capable of enhancing a performance of a fuel cell by accelerating a reaction speed of the fuel cell.

BACKGROUND ART

In general, a fuel cell system has been proposed as a substitution of fossil fuel and differently from a general cell (a second cell), it supplies fuel (hydrogen or hydrocarbon) to an anode and supplies oxygen to a cathode. Thus, the fuel cell system undergoes an electrochemical reaction between hydrogen and oxygen without a combustion reaction (oxidation reaction) of fuel and thereby directly converts an energy difference between before and after a reaction into electric energy.

As shown in FIG. 1, a fuel cell system in accordance with the conventional art comprises: a fuel cell stack 106 that an anode 102 and a cathode 104 are stacked with plural numbers in a state that an electrolyte membrane (not shown) is interposed therebetween in order to generate electric energy by an electrochemical reaction between hydrogen and oxygen are stacked with the plural number; a fuel tank 108 for supplying fuel to the anode 102; and an oxidant supplying unit 110 for supplying oxidant to the cathode 104.

The fuel tank 108 and the anode 102 of the fuel cell stack 106 are connected to each other by a fuel supplying line 112, and a fuel pump 114 for pumping fuel stored in the fuel tank 108 is installed at the fuel supplying line 112.

As oxidant supplied to the cathode 104, oxygen-including air is used. According to this, the oxidant supplying unit 110 comprises: an air compressor 118 for supplying air to the cathode 104 of the fuel cell stack 106; an air filter 120 for filtering air supplied to the fuel cell stack 106; and a humidifier 122 for humidifying air supplied to the fuel cell stack 106.

Processes for generating electric energy by supplying fuel to the conventional fuel cell will be explained as follows.

When the fuel pump 114 is operated by a control signal of a controller (not shown), fuel stored in the fuel tank 108 is pumped thus to be supplied to the anode 102 of the fuel cell stack 106. Also, when the air compressor 118 is operated, air filtered by the air filter 120 passes through the humidifier 122 thus to be humidified and is supplied to the cathode 104 of the fuel cell stack 106.

Once fuel and air are supplied to the fuel cell stack 106, an electrochemical oxidation of hydrogen is performed in the anode 102 and an electrochemical deoxidation of oxygen is performed in the cathode 104 in a state that the electrolyte membrane (not shown) is interposed between the anode 102 and the cathode 104. At this time, electricity is generated due to movement of generated electrons, and is supplied to a load 124.

In the conventional fuel cell system, oxygen-including air is used as an oxidant thus to generate 4 electrons per a unit reaction. Accordingly, a reaction speed is relatively slow in the fuel cell stack thus to lower a performance of the fuel cell.

DISCLOSURE OF THE INVENTION

Therefore, it is an object of the present invention to provide a fuel cell system capable of obtaining a relatively high current density by supplying ozone to a cathode of a fuel cell stack and thus by accelerating a reaction speed in the fuel cell stack.

To achieve these objects, there is provided a fuel cell system comprising: a fuel cell stack including an anode, a cathode, and an electrolyte membrane disposed therebetween; a fuel supplying unit connected with the anode of the fuel cell stack by a fuel supplying line for supplying fuel to the anode; and an oxidant supplying unit connected to the cathode of the fuel cell stack by an air supplying line for adding ozone to oxygen-including air and thereby supplying to the cathode of the fuel cell stack.

MODES FOR CARRYING OUT THE PREFERRED EMBODIMENTS

Hereinafter, a fuel cell system according to the present invention will be explained as follows.

The fuel cell system according to the present invention can have a plurality of embodiments, but the most preferred embodiment will be explained hereinafter.

Figure 1:
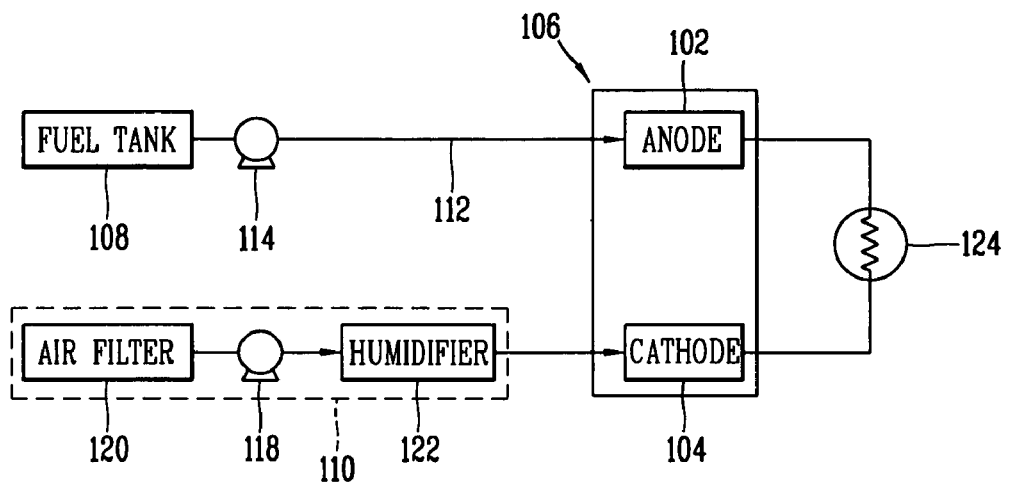
FIG. 1 is a construction view of a fuel cell system in accordance with the conventional art.
Figure 2:
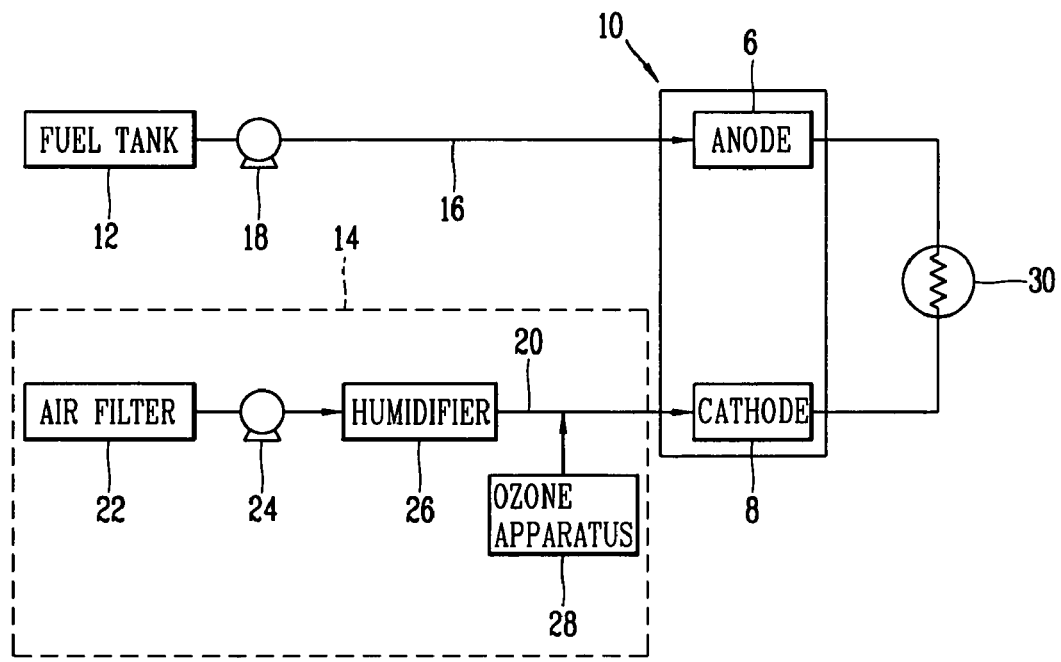
FIG. 2 is a construction view of a fuel cell system according to one embodiment of the present invention.

FIG. 2 is a construction view of a fuel cell system according to one embodiment of the present invention.

The fuel cell system according to the first embodiment of the present invention comprises: a fuel cell stack 10 that an anode 6 and a cathode 8 are stacked with plural numbers so as to generate electric energy by an electrochemical reaction between hydrogen and oxygen in a state that an electrolyte membrane (not shown) is disposed therebetween; a fuel supplying unit connected by a fuel supplying line for supplying fuel to the anode 6; and an oxidant supplying unit 14 for adding ozone to oxygen-including air and thereby supplying to the cathode 8 of the fuel cell stack.

The fuel supplying unit comprises: a fuel tank 12 for storing fuel; a fuel supplying line 16 connected between the fuel tank 12 and the anode 6 of the fuel cell stack 10; and a fuel pump 18 installed at one side of the fuel supplying line 16 for pumping fuel stored in the fuel tank 12.

The oxidant supplying unit 14 comprises: an air supplying line 20 for inducing atmospheric air to the cathode 8 of the fuel cell stack 10; an air filter 22 installed at an inlet of the air supplying line 20 for filtering air sucked into the air supplying line 20; an air compressor 24 installed at one side of the air supplying line 20 for generating a suction power for sucking external air; a humidifier 26 for humidifying air sucked by the air compressor 24; and an ozone apparatus 28 for adding ozone to air supplied to the cathode 8 of the fuel cell stack 10.

The ozone apparatus 28 is connected with the air supplying line 20 which connects the humidifier 26 and the cathode 8 of the fuel cell stack 10 and thereby adds ozone to air humidified by the humidifier 26.

Operation of the fuel cell system according to the first embodiment will be explained as follows.

First, when the fuel pump 18 is operated, fuel stored in the fuel tank 12 is supplied to the anode 6 of the fuel cell stack 10 through the fuel supplying line 16. Then, when the air compressor 24 is operated, external air passes through the air filter 22 thus to be filtered and passes through the humidifier 26 thus to be humidified, thereby being supplied to the anode 6 of the fuel cell stack 10. At this time, ozone generated from the ozone apparatus 28 is added to the humidified air and thus to be supplied to the cathode 8.

The reaction in the fuel cell stack will be explained in detail. In case of an alkaline electrolyte fuel cell, an electrochemical oxidation reaction such as $3H_2+6OH^-\rightarrow 6H_2O+6e^-$ is generated in the anode 6, and an electrochemical deoxidation reaction such as $O_3+6e^-+3H_2O\rightarrow 6OH^-$ is generated in the cathode 8 thus to generate current. The generated current is supplied to a load 30.

Also, in case of an alkaline electrolyte fuel cell, an electrochemical oxidation reaction such as $3H_2\rightarrow 6H^++6e^-$ is generated in the anode 6, and an electrochemical deoxidation reaction such as $O_3+6e^-+6H^+\rightarrow 3H_2O$ is generated in the cathode 8 thus to generate current. The generated current is supplied to the load 30.

In the fuel cell system according to the first embodiment, 6 electrons are generated per a unit reaction thus to obtain a relatively high current density.

Figure 3:
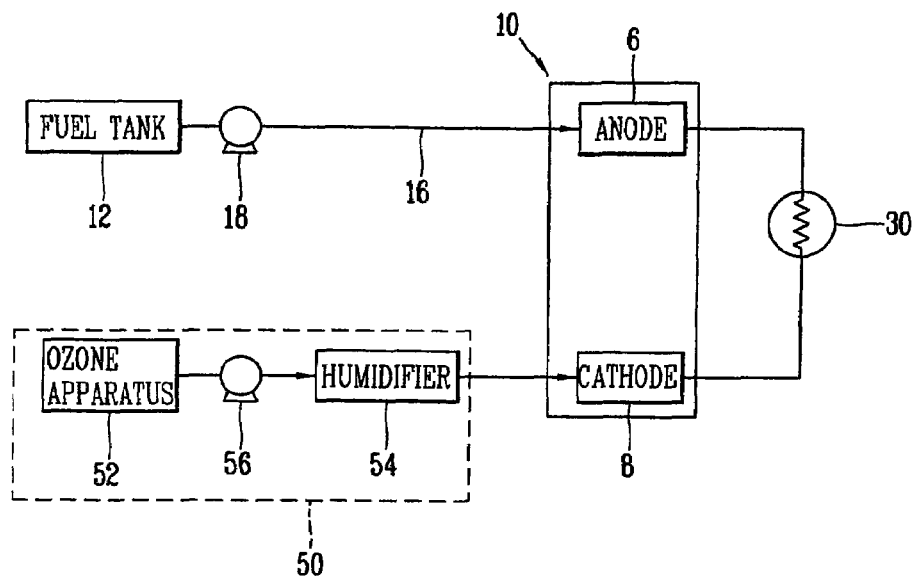
FIG. 3 is a construction view of a fuel cell system according to a second embodiment of the present invention.

FIG. 3 is a construction view of a fuel cell system according to a second embodiment of the present invention.

The fuel cell system according to the second embodiment comprises: a fuel cell stack 10 that an anode 6 and a cathode 8 are stacked with plural numbers so as to generate electric energy by an electrochemical reaction between hydrogen and oxygen in a state that an electrolyte membrane (not shown) is disposed therebetween; a fuel tank 12 for storing fuel supplied to the anode 6; and an oxidant supplying unit 50 for supplying ozone to the cathode 8 of the fuel cell stack.

The oxidant supplying unit 50 comprises: an ozone apparatus 52 for generating ozone; an ozone supplying line 56 connected between the ozone apparatus 52 and the cathode 8 of the fuel cell stack 10 for supplying ozone generated from the ozone apparatus 52 to the cathode 8 of the fuel cell stack 10; and a humidifier 54 installed at the ozone supplying line 56 for humidifying ozone generated from the ozone apparatus 52.

Operation of the fuel cell system according to the second embodiment will be explained.

First, the fuel pump 18 is operated and thereby fuel stored in the fuel tank 12 is supplied to the anode 6 of the fuel cell stack 10 through the fuel supplying line 16. Then, the ozone apparatus 52 is operated thus to generate ozone, and the generated ozone passes through the humidifier 54 thus to be humidified and is supplied to the cathode 8.

A reaction formula in the fuel cell stack 10 is the same as the reaction formula explained in the first embodiment, thereby omitting its explanation.

Figure 4:
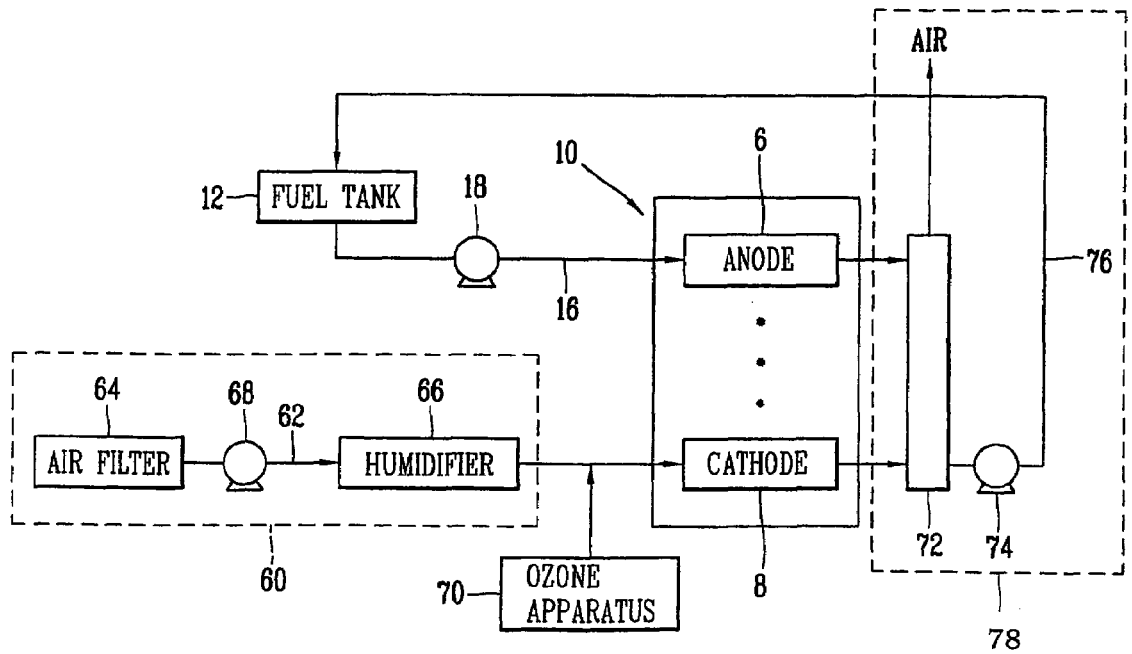
FIG. 4 is a construction view of a fuel cell system according to a third embodiment of the present invention.

FIG. 4 is a construction view of a fuel cell system according to a third embodiment of the present invention.

The fuel cell system according to the third embodiment of the present invention comprises: a fuel cell stack 10 that an anode 6 and a cathode 8 are stacked with plural numbers in a state that an electrolyte membrane (not shown) is disposed therebetween; a fuel tank 12 for storing fuel supplied to the cathode 8; an oxidant supplying unit 60 for supplying oxygen-including air to the cathode 8; a fuel recycling unit 78 for recycling fuel exhausted from the fuel cells stack 10 into the fuel tank 12; and an ozone apparatus 70 for adding ozone to air supplied to the cathode 8 of the fuel cell stack 10.

The oxidant supplying unit 60 comprises: an air supplying line 62 for inducing atmospheric air to the cathode 8 of the fuel cell stack 10; an air filter 64 for filtering air sucked through the air supplying line 62; an air compressor 68 installed at one side of the air supplying line 62 for generating a suction power for sucking external air; and a humidifier 66 for humidifying air sucked by the air compressor 68.

The ozone apparatus 70 is installed at the air supplying line 62 which connects the humidifier 66 and the cathode 8 of the fuel cell stack 10 and thereby adds ozone to air humidified by passing through the humidifier 66.

The fuel recycling unit 78 comprises: a gas/liquid separator 72 for separating gas from liquid in fuel exhausted from the anode 6 and the cathode 8 after reaction; a recycling line 76 for recycling liquid fuel exhausted from the gas/liquid separator 72 into the fuel tank 12; and a recycling pump 74 installed at the recycling line 76 for pumping recycled liquid fuel to the fuel tank 12.

Operation of the fuel cell system according to the third embodiment of the present invention will be explained.

When the fuel pump 18 is operated, fuel stored in the fuel tank 12 is supplied to the anode 6 of the fuel cell stack 10 through the fuel supplying line 16. Also, when the air compressor 68 is operated, external air passes through the air filter 64 thus to be filtered and passes through the humidifier 66 thus to be humidified. Ozone generated from the ozone apparatus 70 is added to the humidified air and the humidified air is supplied to the cathode 8 of the fuel cell stack 10.

Then, fuel exhausted from the fuel cell stack 10 after reaction is separated into gas and liquid in the gas/liquid separator 72, and liquid fuel is recycled into the fuel tank 12 through the fuel recycling line 76.

Figure 5:
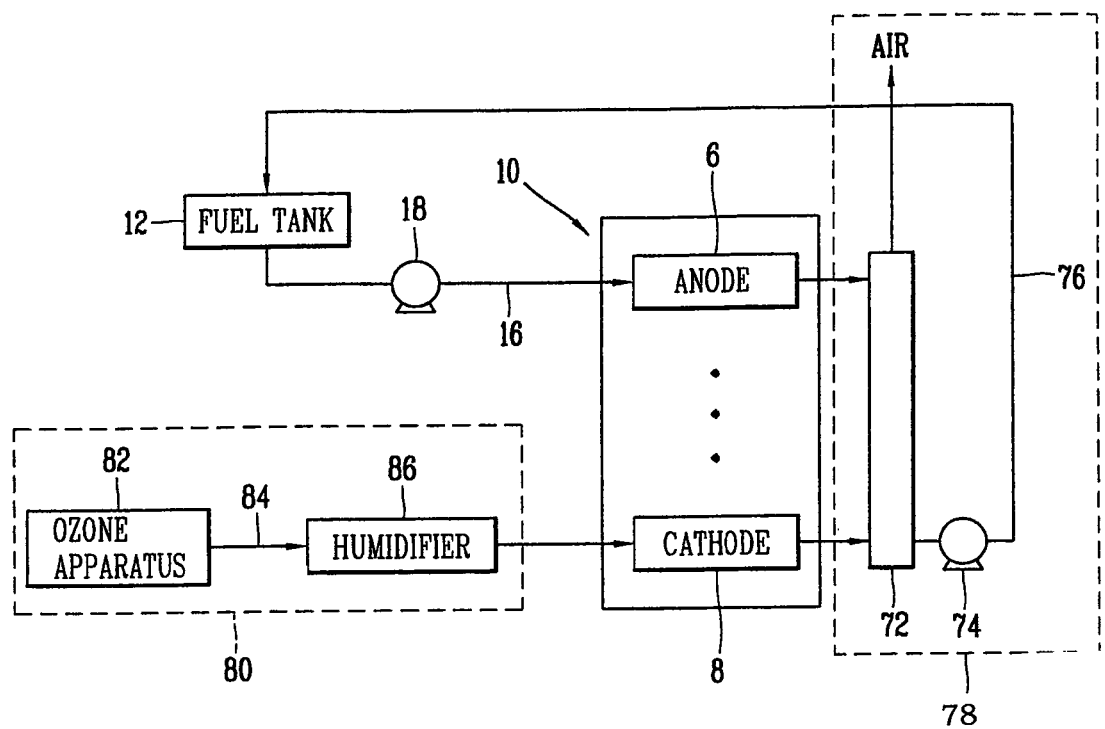
FIG. 5 is a construction view of a fuel cell system according to a fourth embodiment of the present invention.

FIG. 5 is a construction view of a fuel cell system according to a fourth embodiment of the present invention.

The fuel cell system according to the fourth embodiment has the same structure as the fuel cell system explained in the third embodiment except that an oxidant supplying unit 80.

The oxidant supplying unit 80 according to the fourth embodiment comprises: an ozone apparatus 82 for generating ozone; an ozone supplying line 84 for connecting the ozone apparatus 82 and the cathode 8 of the fuel cell stack 10; and a humidifier 86 installed at the ozone supplying line 84 for humidifying ozone generated from the ozone apparatus 82.

In the fuel cell system according to the fourth embodiment, humidified ozone is directly supplied to the cathode 8 of the fuel cell stack 10 thus to be reacted, and fuel exhausted from the fuel cell stack 10 after reaction is recycled into the fuel tank 12 by the fuel recycling unit 78.

According to the fuel cell system of the present invention, air to which ozone is added or ozone is supplied to the cathode of the fuel cell stack thus to accelerate a reaction speed in the fuel cell stack and thus to obtain a high current density, thereby increasing a performance of the fuel cell.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A fuel cell system, comprising:
a fuel cell stack including an anode, a cathode, and an electrolyte membrane disposed therebetween;
a fuel supply unit connected to the anode by a fuel supply line and configured to supply fuel to the anode;
an oxidant supply unit connected to the cathode by an air supply line configured to supply ozone and oxygen-including air to the cathode, wherein the oxidant supply unit comprises:
a humidifier configured to humidify air sucked though the air supplying line; and
an ozone generator configured to generator ozone to be added to air supplied to the cathode, wherein the ozone generator is provided at a portion of the supply line which connects the humidifier and the cathode so as to add ozone to the humidified air; and
a fuel recycling device configured to return fuel exhausted from fuel cell stack back to the fuel supply unit.

2. The fuel cell system of claim 1, wherein the fuel recycling device comprises:
a separator configured to separate gas from liquid in fuel exhausted from the fuel cell stack;
a recycling line extending between the separator and the fuel supply unit; and
a recycling pump configured to pump liquid from the separator through the recycling line to the fuel supply unit.

3. A fuel cell system, comprising:
a fuel cell stack including an anode, a cathode, and an electrolyte membrane disposed therebetween;
a fuel supply unit connected to the fuel cell stack by a fuel supply line and configured to supply fuel to the anode;
an oxidant supply unit connected to the cathode by a supple line, wherein the oxidant supply unit comprises an ozone generator which supplies ozone as the input oxidant gas; and
a humidifier that is interposed between the ozone generator and the cathode so as to humidify the ozone generated by the ozone generator before it enters the cathode.

4. The fuel cell system of claim 3, further comprising a fuel recycling device configured to return fuel exhausted from the fuel cell stack back to the fuel supply unit.

5. The fuel cell system of claim 4, wherein the fuel recycling device comprises:
a separator configured to separate gas from liquid in fuel exhausted from the fuel cell stack;
a recycling line extending between the separator and the fuel supply unit; and
a recycling pump configured to pump liquid from the separator through the recycling line to the fuel supply unit.

6. The fuel cell system of claim 3, further comprising a fuel recycling device configured to return fuel exhausted from the fuel cell stack back to the fuel supply unit.

7. The fuel cell system of claim 6, wherein the fuel recycling device comprises:
a separator configured to separate gas from liquid in fuel exhausted from the fuel cell stack;
a recycling line extending between the separator and the fuel supply unit; and
a recycling pump configured to pump liquid from the separator through the recycling line to the fuel supply unit.

8. A fuel cell system, comprising:
a fuel cell stack including an anode, a cathode, and an electrolyte membrane disposed therebetween;
a fuel supply unit connected to the anode by a fuel supply line and configured to supply fuel to the anode; and
an oxidant supply unit connected to the cathode by an air supply line and configured to add ozone to oxygen-including air and to supply the ozone and oxygen-including air to the cathode, wherein the oxidant supply unit comprises:
a humidifier configured to humidify air sucked through the air supply line; and
an ozone generator configured to generate ozone to be added to air supplied to the cathode, wherein the ozone generator is coupled to an air supply line which connects the humidifier and the cathode in order to add ozone to the humidified air.

9. The fuel cell system of claim 8, further comprising a fuel recycling device configured to return fuel exhausted from the fuel cell stack back to the fuel supply unit.

10. The fuel cell system of claim 9, wherein the fuel recycling device comprises:
a separator configured to separate gas from liquid in fuel exhausted from the fuel cell stack;
a recycling line extending between the separator and the fuel supply unit; and
a recycling pump configured to pump liquid from the separator through the recycling line to the fuel supply unit.

11. The fuel cell system of claim 10, wherein the separator is configured to separate gas from liquid in fuel exhausted from the anode and the cathode after respective electrochemical reactions therein.

* * * * *